United States Patent
Rhee et al.

(10) Patent No.: US 7,485,246 B2
(45) Date of Patent: Feb. 3, 2009

(54) FABRICATION METHOD OF SINTERED DUPLEX NUCLEAR FUEL PELLET

(75) Inventors: Young Woo Rhee, Daejeon (KR); Keon Sik Kim, Daejeon (KR); Jong Hun Kim, Daejeon (KR); Ki Won Kang, Daejeon (KR); Jae Ho Yang, Daejeon (KR); Kun Woo Song, Daejeon (KR); Youn Ho Jung, Daejeon (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 364 days.

(21) Appl. No.: 11/049,452

(22) Filed: Feb. 2, 2005

(65) Prior Publication Data

US 2005/0261136 A1 Nov. 24, 2005

(30) Foreign Application Priority Data

May 19, 2004 (KR) .................. 10-2004-0035571

(51) Int. Cl.
  *G21C 21/00* (2006.01)
(52) U.S. Cl. ....................... 264/0.5; 264/646
(58) Field of Classification Search ................. 264/0.5, 264/646
  See application file for complete search history.

(56) References Cited

U.S. PATENT DOCUMENTS 4,460,522 A * 7/1984 Kinugasa et al. ............. 264/0.5
4,678,629 A   7/1987 Popa
5,257,298 A   10/1993 Yuda et al.
5,309,493 A   5/1994 Kamimura et al.
5,978,431 A * 11/1999 Edwards ..................... 376/261
6,320,091 B1 * 11/2001 Ebbinghaus et al. .......... 588/10
6,656,391 B1 * 12/2003 Bonnerot et al. ............ 252/643

FOREIGN PATENT DOCUMENTS

| DE | 195 32 813 A1 | 3/1997 |
| EP | 0 502 395 A1 | 9/1992 |
| EP | 0 949 631 A1 | 10/1999 |
| JP | 04-022892 A | 1/1992 |
| JP | 11-258374 A | 9/1999 |
| KR | 10-0281169 B1 | 11/2000 |
| KR | 10-0354544 B1 | 8/2001 |

OTHER PUBLICATIONS

Fisher, M. et al., "Development of a Double Pellet $ThO_2$-$UO_2$", *Journal of Nuclear Materials* 138 (1986) pp. 242-247, North-Holland, Amsterdam.

* cited by examiner

*Primary Examiner*—Steven P Griffin
*Assistant Examiner*—Russell J Kemmerle, III
(74) *Attorney, Agent, or Firm*—The Webb Law Firm

(57) ABSTRACT

A method for fabricating a sintered duplex nuclear fuel pellet includes the steps of: preparing a first powder composed of a material selected from the group consisting of $UO_2$ and $UO_2$—$Er_2O_3$, and a second powder composed of $UO_2$—$Gd_2O_3$ and a sintering additive; producing a duplex compact consisting of an annular outer portion composed of the first powder and a cylindrical inner portion composed of the second powder; and sintering the duplex compact under a reducing gas atmosphere, wherein the sintering additive contains manganese of 0.001% to 2% by weight based on the total weight of the cylindrical inner portion.

6 Claims, 3 Drawing Sheets

FABRICATION METHOD OF SINTERED DUPLEX NUCLEAR FUEL PELLET

RELATED APPLICATIONS

The present application is based on, and claims priority from, Korean Application NO. 2004-35571, filed on May 19, 2004, the disclosure of which is incorporated by reference herein in its entirety.

BACKGROUND OF THE INVENTION

1. Field of the Invention

The present invention relates to a method for fabricating a sintered duplex nuclear fuel pellet, and more particularly to a method for fabricating a sintered duplex nuclear fuel pellet consisting of a cylindrical inner portion composed of $UO_2$—$Gd_2O_3$ and an annular outer portion composed of $UO_2$—$Er_2O_3$ or $UO_2$, which is capable of preventing the occurrence of cracks due to the difference in the densification rate between the two portions upon sintering.

2. Description of the Related Art

Generally, the most widely used sintered pellet as a nuclear fuel is a sintered uranium dioxide ($UO_2$) pellet. The sintered uranium dioxide pellet mainly has a height of about 10 mm and a diameter of about 8 mm in a cylindrical shape for practical application. The sintered $UO_2$ pellet contains 1-5% by weight of $U^{235}$ and produces nuclear fission energy while $U^{235}$ decays by the action of neutrons during use in a nuclear reactor. In addition to the sintered $UO_2$ pellet, a sintered burnable absorber pellet containing neutron absorbing materials, such as gadolinium (Gd) or erbium (Er), is used in a nuclear reactor to control the numbers of neutrons.

The sintered burnable absorber pellet has generally the same size as the sintered $UO_2$ pellet. Gd or Er is uniformly distributed throughout the whole sintered $UO_2$ pellet. The sintered burnable absorber pellet is commonly represented by $(U,Gd)O_2$ or $(U,Er)O_2$, and is fabricated in accordance with the following procedure.

First, $UO_2$ powder is mixed with $Gd_2O_3$ or $Er_2O_3$ powder, and pulverized to prepare a $UO_2$—$Gd_2O_3$ powder or $UO_2$—$Er_2O_3$ powder. At this time, the $Gd_2O_3$ content and the $Er_2O_3$ content are limited to about 15% or less and 4% by weight or less, respectively.

Thereafter, the pulverized powder is subjected to compression molding to produce a compact, which is sintered by heating under a reducing gas atmosphere at 1,600-1,800° C. for 2-4 hours. The density of the compact is about 50-70% of the theoretical value, and that of the sintered pellet is about 95% of the theoretical value. During the sintering, Gd or Er is dissolved into the lattice structure of $UO_2$. The reducing gas may be hydrogen gas, or a mixed gas of hydrogen gas with at least one gas selected from water vapor, inert gases and carbon dioxide.

Korean Patent No. 0281169 (published on Nov. 15, 2000), issued to Korea Atomic Energy Research Institute, describes that a duplex structure consisting of a cylindrical inner portion and an annular outer portion composed of different materials is advantageous over a structure using only a sintered $(U,Gd)O_2$ or $(U,Er)O_2$ pellet as a sintered burnable absorber pellet, because the duplex structure exhibits improved nuclear performance in a nuclear reactor. FIG. 1 is a schematic view showing the structure of a conventional sintered duplex nuclear fuel pellet 10 consisting of a cylindrical inner portion 1 and an annular outer portion 2.

The sintered duplex burnable absorber nuclear fuel pellet is fabricated by charging different nuclear fuel powders into the inner and outer portions, molding the portions to produce a duplex compact, and sintering the duplex compact.

However, the sintering process may have a number of problems based on the fact that the inner portion and the outer portion are composed of different materials. That is, the annular outer portion is composed of a mixed powder $UO_2$—$Er_2O_3$ and the cylindrical inner portion is composed of a mixed powder $UO_2$—$Gd_2O_3$. During the sintering process (also, referred to "densification") for increasing the density of the compact while contracting, a large difference in the densification rate of the cylindrical inner portion and the annular outer portion composed of different materials is caused, which generates an undesirable internal stress at the interface between both portions. Consequently, serious interstices or cracks occur at the interface of the final sintered duplex nuclear fuel pellet.

In an effort to overcome these problems, U.S. Pat. No. 4,678,629 suggests a method comprising sintering a cylindrical inner portion ($UO_2$—$Gd_2O_3$) and an annular outer portion ($UO_2$) separated from each other, and fitting the sintered cylindrical inner portion into the sintered annular outer portion. However, since this method requires precise fabrication and processing of the sintered portions, it is not an effective approach for practical application.

Alternatively, M. Fisher (J. Nucl. Mater., 138, 242-247 (1986)) reported a method for fabricating a sintered duplex pellet consisting of a $ThO_2$ outer portion and a $UO_2$ inner portion through two-step sintering. According to this method, the $UO_2$ inner portion is first sintered, fitted into a $ThO_2$ compact, and further sintered to fabricate a sintered pellet having no cracks. However, this method further involves fitting of the sintered $UO_2$ inner portion into the $ThO_2$ compact, which renders the overall processes more complicated. In addition, since this method does not suggest a basic solution to a large difference in the densification rate between the cylindrical inner portion and the annular outer portion, the occurrence of cracks still cannot be avoided, resulting in deterioration of the strength of the sintered pellet and damage during handling. In particular, the thermal conductivity is reduced, causing a reduction in the operational performance in a nuclear reactor.

Thus, there is a need in the art for a method for fabricating a sintered duplex burnable absorber nuclear fuel pellet free from cracks derived from the difference in the densification rate between a cylindrical inner portion and an annular outer portion composed of different materials upon sintering.

SUMMARY OF THE INVENTION

The present invention has been made in view of the above problems of the prior arts, and it is an object of the present invention to provide a method for fabricating a sintered duplex nuclear fuel pellet consisting of an cylindrical inner portion composed of $UO_2$—$Gd_2O_3$ and an annular outer portion composed of $UO_2$—$Er_2O_3$ or $UO_2$, which is capable of preventing the occurrence of cracks at the interface between the two portions by decreasing the difference in the densification rate of the two portions upon sintering.

In order to accomplish the above object of the present invention, there is provided a method for fabricating a sintered duplex nuclear fuel pellet, comprising the steps of: preparing a first powder composed of a material selected from the group consisting of $UO_2$ and $UO_2$—$Er_2O_3$, and a second powder composed of $UO_2$—$Gd_2O_3$ and a sintering additive; producing a duplex compact consisting of an annular outer portion composed of the first powder and a cylindrical inner portion composed of the second powder; and sintering the duplex compact under a reducing gas atmosphere, wherein the sintering additive contains manganese of 0.001% to 2% by weight based on the total weight of the cylindrical inner portion(or the second powder).

Preferably, the $Er_2O_3$ content in the mixture $UO_2$—$Er_2O_3$ constituting the first powder may be about 4% by weight or less, and the $Gd_2O_3$ content in the mixture $UO_2$—$Gd_2O_3$ constituting the second powder may be in the range of about 4% to about 15% by weight.

Preferably, the density of the sintered duplex fuel nuclear pellet may be more than 94% of theoretical value.

Preferably, the sintering additive may be at least one selected from the group consisting of pure manganese, manganese oxide (MnO), manganese sulfide (MnS), manganese fluoride and manganese chloride. It is more preferable to use manganese compounds, such as manganese oxide (MnO) and manganese sulfide (MnS), having a relatively high melting point(e.g. 1785° C. and 1610° C., respectively).

The reducing gas may be hydrogen gas, or a mixed gas of hydrogen gas with at least one gas selected from water vapor, inert gases and carbon dioxide. The duplex compact can be sintered in the temperature range of between about 1,600° C. and about 1,800° C.

In one embodiment of the present invention, at least a part of the $UO_2$ may be replaced by $PuO_2$.

The present invention is characterized by the addition of the sintering additive containing about 0.001% to about 2% by weight of manganese, such as pure manganese or the manganese compound, based on the total weight of the cylindrical inner portion, to the cylindrical inner portion. Manganese would be dissolved into the lattice of $UO_2$ and $Gd_2O_3$ during sintering and then generate the lattice defects, such as uranium vacancies, because of the difference in valency. Thus, the pure manganese or the manganese compound added promotes the densification of the $UO_2$—$Gd_2O_3$ constituting the cylindrical inner portion to reduce the generation of an internal stress between the cylindrical inner portion and the annular outer portion.

Generally, the $UO_2$—$Er_2O_3$ constituting the annular outer portion shows a similar densification behavior to that of pure $UO_2$, but the $UO_2$—$Gd_2O_3$ constituting the cylindrical inner portion has a very low densification rate in a predetermined sintering temperature range. For these reasons, prior arts have a problem that the occurrence of cracks may be induced due to an unwanted stress generated at the interface of a sintered pellet. To solve this problem, the present invention suggests a method for decreasing a large difference in the densification rate by adding pure manganese or the manganese compound as a sintering additive to the powder constituting the cylindrical inner portion. The manganese used herein is dissolved into the lattice structure of $UO_2$ to promote the sintering of the duplex compact, and to increase the densification rate of the $UO_2$—$Gd_2O_3$ constituting the cylindrical inner portion, thereby decreasing the difference in the densification rate between the $UO_2$—$Gd_2O_3$ constituting the cylindrical inner portion and the $UO_2$—$Er_2O_3$ or pure $UO_2$ constituting the annular outer portion.

Regardless of the kinds of the manganese compound, i.e., manganese oxide (MnO), manganese sulfide (MnS), manganese fluoride and manganese chloride, the desired sintering promotion effects are attainable.

In addition, the method of the present invention can be applied to the fabrication of another sintered duplex nuclear fuel pellet wherein part of the $UO_2$ is replaced by plutonium dioxide ($PuO_2$), which is a nuclear material having the same lattice structure as $UO_2$.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the principle and functions of the present invention will be explained in more detail with reference to the accompanying drawings.

Figure 2:
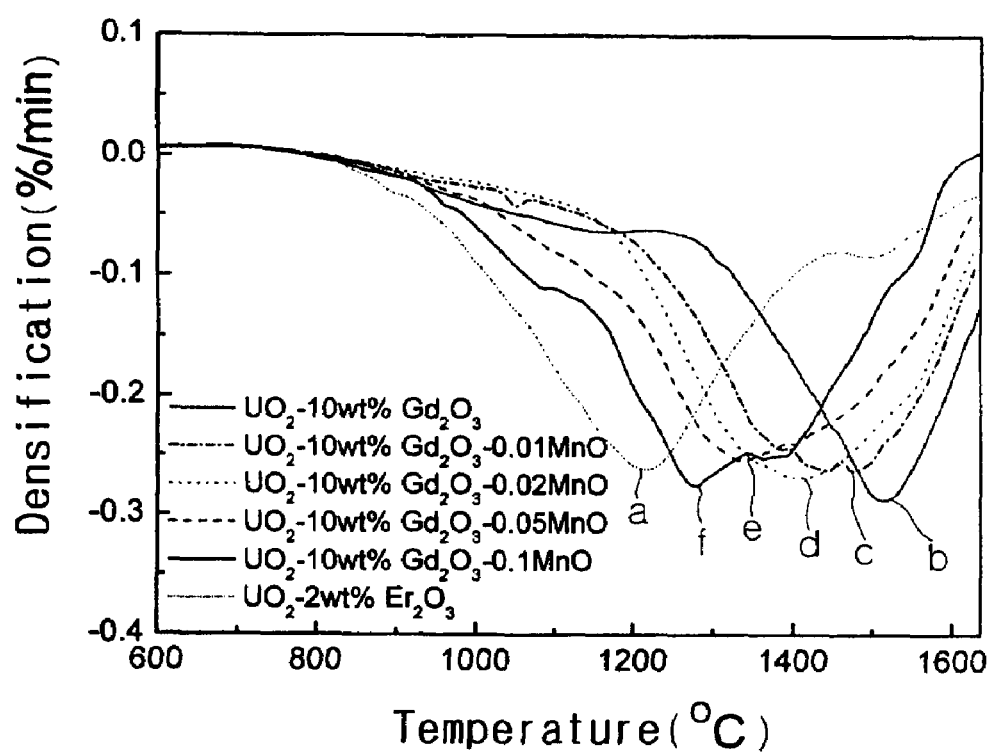
FIG. 2 is a graph showing changes in densification rate with increasing temperatures.

FIG. 2 is a graph illustrating the effect of manganese oxide (MnO) as a sintering additive, and shows changes in the densification rate of respective compounds which can be used to fabricate a sintered nuclear fuel pellet, with increasing temperatures.

Referring to FIG. 2, $UO_2$-2 wt % $Er_2O_3$ (a) constituting an annular outer portion has the highest densification rate at 1,220° C., and $UO_2$-10 wt % $Gd_2O_3$ (b) constituting a cylindrical inner portion has the highest densification rate at 1,510° C. Accordingly, the two portions undergo a large difference in the densification rate during the sintering. That is, the cylindrical inner portion is densified at a higher temperature than the annular outer portion.

However, when the manganese oxide (MnO) is added in amounts of 0.01%, 0.02%, 0.05% and 0.1% by weight to $UO_2$-10 wt % $Gd_2O_3$ (denoted by c, d, e and f in FIG. 2, respectively), based on the total weight of the inner portion, the densification behavior of $UO_2$-10 wt % $Gd_2O_3$ changes to be similar to that of the $UO_2$-2 wt % $Er_2O_3$ (denoted by "a"). Specifically, as the amount of the manganese oxide (MnO) added increases from 0.01% to 0.1% by weight, temperatures showing the highest densification rate are close to 1,220° C.

As demonstrated experimentally above, the densification of the compact is drastically increased by the addition of the manganese compound to the mixed powder $UO_2$—$Gd_2O_3$. These results represent that manganese would be dissolved into the lattice of $UO_2$ and $Gd_2O_3$ at the early stage of sintering and promote the densification by generating the lattice defects, such as uranium vacancies. In addition, it could be confirmed that the difference in the densification rate between the inner portion and the outer portion decreases with increasing sintering temperatures.

In conclusion, a sintered duplex pellet having no cracks at the interface between the inner and outer portions can be fabricated by adding a sintering additive containing manganese to the mixed powder $UO_2$—$Gd_2O_3$ constituting the inner portion, producing a compact, and sintering the compact. The sintering additive contains manganese of 0.001% of 2% by weight based on the total weight of the inner portion. When the amount of manganese added is less than 0.001% by weight, sufficient sintering promotion effects are not attainable. On the other hand, when the amount exceeds 2% by weight, characteristics inherent to the mixed powder $UO_2$—$Gd_2O_3$ constituting the inner portion may be degraded. It is preferable that the sintering additive may be added as pure manganese or manganese compound.

The present invention will now be described in more detail with reference to the following specific examples. These examples illustrate a method for fabricating a sintered duplex nuclear fuel pellet consisting of an inner portion composed of $(U,Gd)O_2$ and an outer portion composed of $(U,Er)O_2$.

EXAMPLE

First, a mixture of 2% by weight of $Er_2O_3$ powder and $UO_2$ powder was charged into a tubular mixer and was then mixed for 1 hour to prepare a mixed powder $UO_2$-2 wt % $Er_2O_3$ for an annular outer portion of a duplex nuclear fuel. Separately, a mixture of manganese oxide (MnO) and $Gd_2O_3$ powder was subjected to ball milling using zirconia balls for 12 hours to prepare a MnO-containing $Gd_2O_3$ powder. Then, the powder thus prepared was mixed with $UO_2$ powder in a tubular mixer for 1 hour, and was then pulverized in a pestle and mortar for 10 minutes to prepare a mixed powder $UO_2$-10 wt % $Gd_2O_3$-0.1 wt % MnO for a cylindrical inner portion.

Figure 1:
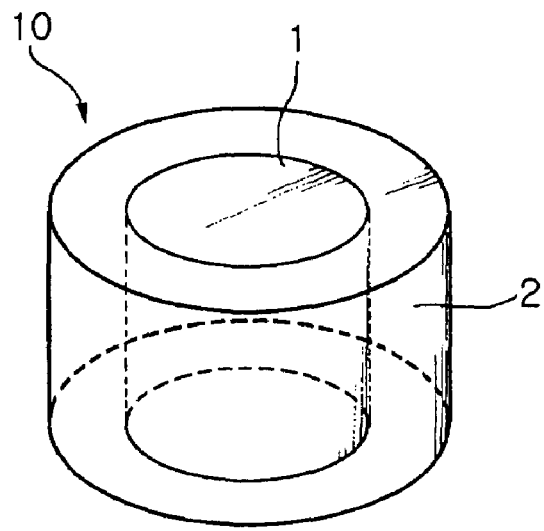
FIG. 1 is a schematic view showing the structure of a conventional sintered duplex nuclear fuel pellet.

The mixed powder $UO_2$-2 wt % $Er_2O_3$ was charged into the annular outer portion and the $UO_2$-10 wt % $Gd_2O_3$-0.1 wt % MnO was charged into the cylindrical inner portion, which was then subjected to compression molding to produce a duplex compact. The duplex compact is shown in FIG. 1. A number of processes for duplex compaction are already known. In this example, the compaction was performed in accordance with the process described in Korean Patent No. 0354544 (published on Sep. 16, 2002), issued to Korea Atomic Energy Research Institute, et al., which is incorporated herein by reference.

Thereafter, the duplex compact was sintered as follows. The compact was heated to 1,700° C. at a rate of 5K/min., and was then maintained under a reducing gas atmosphere at 1,700° C. for 4 hours to fabricate a sintered nuclear fuel pellet. At this time, hydrogen gas, or a mixed gas of hydrogen gas with at least one gas selected from water vapor, inert gases and carbon dioxide, may be used as the reducing gas. In this example, a mixed gas $H_2$-3% $CO_2$ was used. The density of the sintered pellet was about 97% of the theoretical density.

Figure 3A:
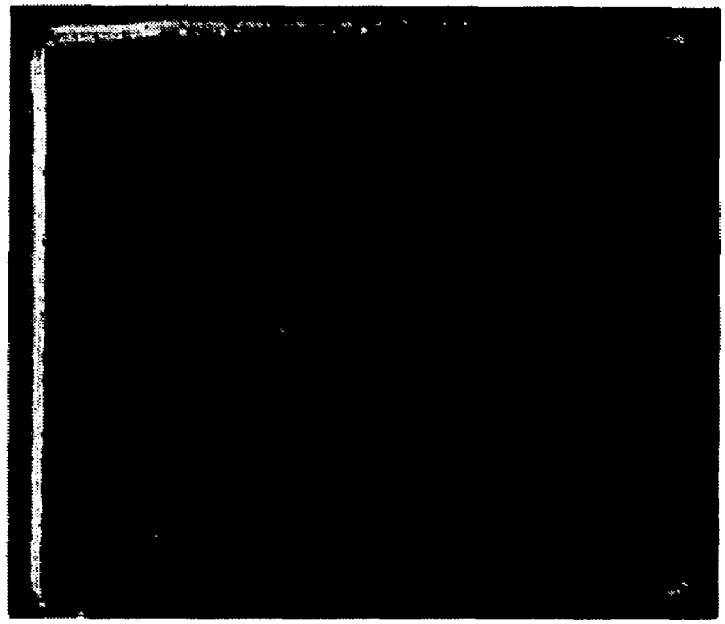
FIGS. 3a and 3b are cross-sectional views showing the structure of a sintered duplex nuclear fuel pellet fabricated by a method of the present invention.
Figure 3B:
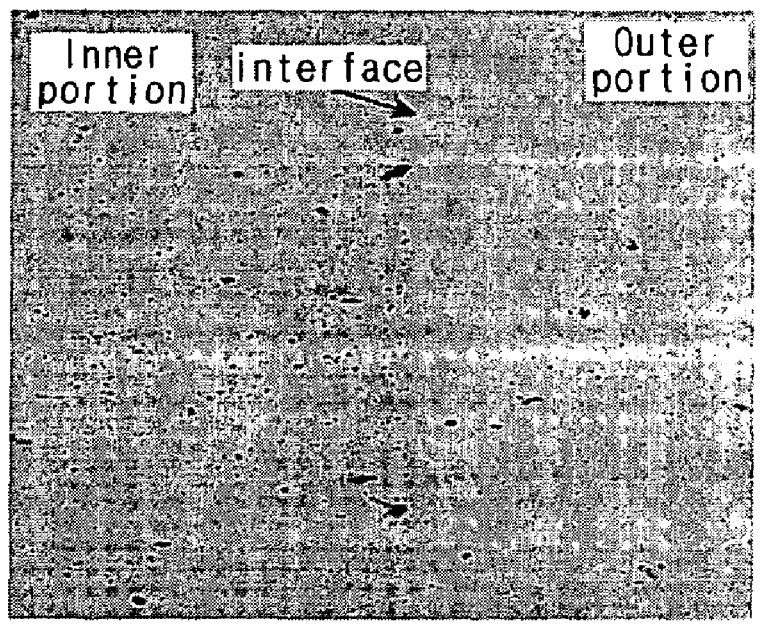

The sintered nuclear fuel pellet thus fabricated was polished along a face parallel to an axial direction. The occurrence of cracks and defects at the interface was observed. FIG. 3a is a photograph of the overall cross-section the sintered duplex nuclear fuel pellet fabricated in Example 1. FIG. 3b is an optical microscope image showing the vicinity of the interface of the sintered duplex nuclear fuel pellet. As shown in FIGS. 3a and 3b, the addition of manganese oxide (MnO) to the inner portion makes it possible to fabricate the sintered duplex nuclear fuel pellet whose interface is clean without the occurrence of cracks.

As can be seen from the graph shown in FIG. 2, the inner portion composed of the mixed powder $UO_2$-10 wt % $Gd_2O_3$ containing 0.1% by weight of manganese oxide (MnO), corresponding to 0.077% by weight of manganese, has the maximum densification rate at 1,280° C., which is similar to the temperature (about 1,220° C.) at which the outer portion composed of the mixed powder $UO_2$-2 wt % $Er_2O_3$ has the maximum densification rate. Accordingly, the final sintered duplex nuclear fuel pellet can be fabricated without the occurrence of interfacial cracks.

COMPARATIVE EXAMPLE

By a similar procedure to that in Example 1, a mixture of 2% by weight of $Er_2O_3$ powder and $UO_2$ powder was charged into a tubular mixer and was then mixed for 1 hour to prepare a mixed powder $UO_2$-2 wt % $Er_2O_3$ for an annular outer portion of a duplex nuclear fuel. Separately, 10% by weight of $Gd_2O_3$ powder, which had been previously subjected to ball milling using zirconia balls for 12 hours, was added to $UO_2$ powder, mixed in a tubular mixer for 1 hour, and pulverized in a pestle and mortar for 10 minutes to prepare a mixed powder $UO_2$-10 wt % $Gd_2O_3$ for an inner portion, whose composition was different from that prepared in Example 1. That is, the procedure was performed in the same manner as in Example 1, except that manganese oxide was not added to the powder constituting the inner portion.

The mixed powder $UO_2$-2 wt % $Er_2O_3$ was charged into the outer portion and the mixed powder $UO_2$-10 wt % $Gd_2O_3$ was charged into the inner portion. Thereafter, the two portions were compacted, and then sintered to fabricate a sintered nuclear fuel pellet.

Figure 4A:
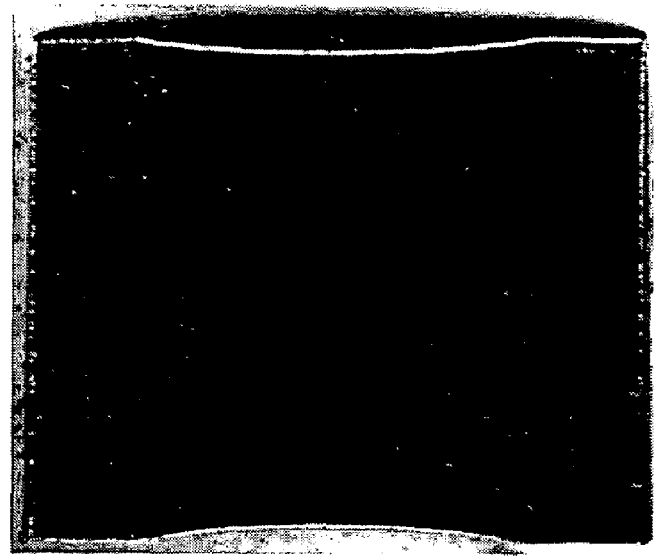
FIGS. 4a and 4b are cross-sectional views showing the structure of a sintered duplex nuclear fuel pellet fabricated by a conventional method.
Figure 4B:
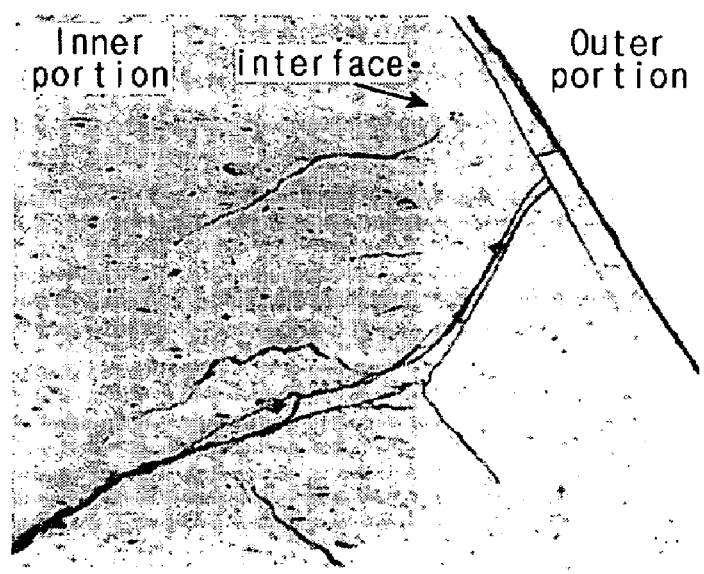

The sintered nuclear fuel pellet thus fabricated was polished along a face parallel to an axial direction. The occurrence of cracks and defects at the interface was observed. FIG. 4a is a photograph of the overall cross-section of the sintered duplex nuclear fuel pellet fabricated in Comparative Example 1. FIG. 4b is an optical microscope image showing the vicinity of the interface of the sintered duplex nuclear fuel pellet. As shown in FIGS. 4a and 4b, many cracks were observed in the inner and outer portions of the sintered duplex nuclear fuel pellet.

As explained earlier, the occurrence of cracks in the nuclear fuel sintered pellet fabricated in Comparative Example 1 is due to non-uniform densification resulting from a large difference in the sintering rate of the outer and inner portions.

Specifically, as shown in FIG. 2, the inner portion of the sintered duplex nuclear fuel pellet composed of the mixed powder $UO_2$-10 wt % $Gd_2O_3$ has a maximum densification rate at 1,510° C., whereas the outer portion of the sintered duplex nuclear fuel pellet composed of the mixed powder $UO_2$-2 wt % $Er_2O_3$ has a maximum densification rate at 1,220° C. Accordingly, there is a large difference in the contraction at the interface with increasing sintering temperatures. This difference generates a stress at the interface, resulting in the occurrence and growth of cracks.

As shown in FIG. 4b, the cracks begin to grow at the interface between the inner and outer portions, and propagate through the inner portion in a direction perpendicular to the interface and through the outer portion in a direction virtually parallel to the interface. This crack propagation behavior suggests that a tensile stress is generated parallel to a lengthwise direction in the inner portion, and a compressive stress is generated parallel to a lengthwise direction in the outer portion. Accordingly, it appears that cracks occur due to a stress generated while the inner portion having a relatively low densification rate is contracted after the outer portion having a relatively high sintering rate is sintered.

In contrast, according to Example 1 of the present invention, the sintered duplex nuclear fuel pellet can be fabricated without the occurrence of cracks at the interface between the inner and outer portions by adding manganese oxide (MnO) as a sintering additive to the cylindrical inner portion in order to decrease the difference in the densification rate of the two portions upon sintering. In addition to the manganese oxide (MnO), the sintering additive used herein may be pure manganese, manganese sulfide, manganese fluoride, manganese chloride or the combination thereof. Regardless of the kind of these manganese compounds, sintering promotion effects similar to those in Example 1 are attainable. It is preferable to use manganese compounds having a relatively high melting point.

Although the present invention has been described herein with reference to the foregoing examples and the accompanying drawings, it is intended that the scope of the present invention is defined by the claims that follow. Accordingly, those skilled in the art will appreciate that various substitutions, modifications and changes are possible, without departing from the technical spirit of the present invention as disclosed in the accompanying claims. It is to be understood that such substitutions, modifications and changes are within the scope of the present invention.

That is, although the sintered duplex nuclear fuel pellet containing $UO_2$ has been described in the foregoing examples and the accompanying drawings, the method of the present invention can be applied to the fabrication of sintered duplex nuclear fuel pellets containing different materials. For instance, although the method of the present invention is applied to the fabrication of another sintered duplex nuclear fuel pellet wherein a portion of the $UO_2$ is replaced with plutonium dioxide ($PuO_2$), which is a nuclear material having the same lattice structure as $UO_2$, the same crack preventing effect can be expected. It should, of course, be understood that this modified embodiment are within the scope and spirit of the invention as disclosed in the accompanying claims.

As apparent from the above description, according to the present invention, the sintered duplex nuclear fuel pellet can be fabricated which has few or no cracks at the interface between the cylindrical inner and annular outer portions by adding a small amount of pure manganese or the manganese compound as a sintering additive to the mixed powder $UO_2$—$Gd_2O_3$ constituting the inner portion. Since the sintered duplex nuclear fuel pellet having no defects has a high mechanical strength and shows superior heat transfer efficiency, it is expected to greatly improve the operational performance in a nuclear reactor.

What is claimed is:

1. A method for fabricating a sintered duplex nuclear fuel pellet, comprising the steps of:
preparing a first powder composed of a material selected from the group consisting of $UO_2$ and $UO_2$—$Er_2O_3$, and a second powder composed of $UO_2$—$Gd_2O_3$ and a sintering additive;
producing a duplex compact consisting of an annular outer portion composed of the first powder and a cylindrical inner portion composed of the second powder; and
sintering the duplex compact under a reducing gas atmosphere,
wherein the sintering additive is manganese oxide of from 0.001% to 2% by weight based on the total weight of the cylindrical inner portion, and the density of the sintered duplex nuclear fuel pellet is more than 94% of theoretical value,
wherein the sintering additive is added only to the second powder.

2. The method according to claim 1, wherein the $Er_2O_3$ content in the mixture $UO_2$—$Er_2O_3$ constituting the first powder is 4% by weight or less.

3. The method according to claim 1, wherein the $Gd_2O_3$ content in the mixture $UO_2$—$Gd_2O_3$ constituting the second powder is in the range of 4% to 15% by weight.

4. The method according to claim 1, wherein the reducing gas is hydrogen gas, or a mixed gas of hydrogen gas with at least one gas selected from water vapor, inert gases and carbon dioxide.

5. The method according to claim 1, wherein the duplex compact is sintered in the temperature range of between 1,600° C. and 1800° C.

6. The method according to claim 1, wherein at least part of the $UO_2$ constituting the annular outer portion and the cylindrical inner portion is replaced by $PuO_2$.

* * * * *